US011662156B2

(12) United States Patent
Nomen Calvet et al.

(10) Patent No.: US 11,662,156 B2
(45) Date of Patent: *May 30, 2023

(54) ARRANGEMENT FOR A LATENT-HEAT EXCHANGER CHAMBER

(71) Applicants: WGA WATER GLOBAL ACCESS S.L., Sispony (AD); Juan Eusebio Nomen Calvet, L'Aldosa (AD); Dan Alexandru Hanganu, Barcelona (ES)

(72) Inventors: Juan Eusebio Nomen Calvet, L'Aldosa (AD); Dan Alexandru Hanganu, Barcelona (ES)

(73) Assignee: WGA WATER GLOBAL ACCESS S.L., Sispony (AD)

( * ) Notice: Subject to any disclaimer, the term of this patent is extended or adjusted under 35 U.S.C. 154(b) by 268 days.

This patent is subject to a terminal disclaimer.

(21) Appl. No.: 16/770,502

(22) PCT Filed: Dec. 4, 2018

(86) PCT No.: PCT/ES2018/070781
§ 371 (c)(1),
(2) Date: Jun. 5, 2020

(87) PCT Pub. No.: WO2019/110861
PCT Pub. Date: Jun. 13, 2019

(65) Prior Publication Data
US 2020/0378691 A1 Dec. 3, 2020

(30) Foreign Application Priority Data

Dec. 5, 2017 (ES) .......................... ES201731494U

(51) Int. Cl.
*F28D 15/04* (2006.01)
*B01D 1/20* (2006.01)
(Continued)

(52) U.S. Cl.
CPC ............ *F28D 15/046* (2013.01); *B01D 1/20* (2013.01); *B01D 1/28* (2013.01); *B01D 5/0003* (2013.01);
(Continued)

(58) Field of Classification Search
CPC .......... B01D 1/16; B01D 1/20; B01D 5/0003; B01D 5/006; B01D 5/075; F28D 15/0253; F28D 15/046
See application file for complete search history.

(56) References Cited

U.S. PATENT DOCUMENTS 3,305,454 A * 2/1967 Cowley .................... B01D 3/10
202/205
2006/0225863 A1 10/2006 Levin
2017/0030656 A1 2/2017 Lien et al.

FOREIGN PATENT DOCUMENTS

CA 2983371 A1 * 10/2016 ............... B01D 1/04
CN 107167013 A 9/2017
(Continued)

OTHER PUBLICATIONS

PCT/ES2018/070781 Intemtional Search Report completed Apr. 26, 2019.

*Primary Examiner* — Renee Robinson
(74) *Attorney, Agent, or Firm* — Brooks Kushman P.C.; John E. Nemazi

(57) ABSTRACT

The invention relates to an arrangement for a latent-heat exchanger chamber, usable in distillation devices, which comprises an evaporator in a capillary evaporation regime on the inner face thereof and a condenser in a capillary condensation regime on the outer face thereof, with a system for the dosed supply of liquid into microgrooves or micro undulations of the inner evaporator face, preventing the
(Continued)

formation of thin films of water on the evaporator face, the arrangement achieving high latent-heat transfer coefficients.

9 Claims, 4 Drawing Sheets

(51) Int. Cl.
*B01D 5/00* (2006.01)
*C02F 1/04* (2023.01)
*F28D 15/02* (2006.01)
*B01D 1/28* (2006.01)
*C02F 103/08* (2006.01)

(52) U.S. Cl.
CPC ........... *B01D 5/006* (2013.01); *B01D 5/0075* (2013.01); *C02F 1/041* (2013.01); *C02F 1/048* (2013.01); *F28D 15/0233* (2013.01); *C02F 2103/08* (2013.01)

(56) References Cited

FOREIGN PATENT DOCUMENTS

| | | | | |
|---|---|---|---|---|
| JP | 2013088049 A | 5/2013 | | |
| WO | WO-2020068212 A1 * | 4/2020 | ............. | F28D 15/02 |

* cited by examiner

ARRANGEMENT FOR A LATENT-HEAT EXCHANGER CHAMBER

The present invention relates to an arrangement for a latent heat exchanger chamber, which comprises an evaporator on its inner face and a condenser on its outer face, applicable to distillation devices.

STATE OF THE ART

The technical problems to be solved are:

The current horizontal latent heat exchangers of tubes and casing or chambers, with smooth or corrugated tubes or chambers whose outer face is evaporative and on which the liquid fluid to be evaporated is provided, in a thin descending film regime, have their latent heat transfer coefficient limited by the thermal resistance of the thin descending liquid film on the evaporating face and by the resistance of the condensed water layers on the condensing face. The use of tubes or chambers with corrugated surfaces increases the exchange surface and creates efficient liquid flow turbulence effects that improve thermal performance, but the added transfer coefficient is still limited by the thermal resistance of the liquid layers. The thermal resistance of a thin descending layer of liquid fluid, especially when it is water or aqueous solutions, reduces the added latent heat transfer coefficient of the tubes or chambers, which determines the thermal gradient currently used between the temperature of the evaporated vapour on the outer evaporating face and the temperature of the condensed vapour on the inner condensing face.

Current vertical tubes and casing heat exchangers with smooth or corrugated tubes that operate on their outer face as condensers and on their inner face as falling or rising film evaporators have their latent heat transfer thermal coefficient limited by the thermal resistance of the liquid layers on both sides of the exchanger tube. The use of double-fluted corrugated pipes on both sides improves the added latent heat transfer coefficient due to the turbulences generated in the liquid flows and the increased exchange surface, but this coefficient is still limited by the thermal resistance of the liquid layers. The current temperature differential between both sides of the tubes or chambers of these devices is also conditioned by the thermal resistance of the liquid films that cover, at least in part, both sides of the vertical tube wall, especially when it is water or aqueous solutions.

The current heat exchangers with condenser-evaporator tubes in capillary condensation regime on their inner face and capillary evaporation on their outer face present the following practical problems of supplying the liquid fluid to evaporate on the evaporating outer face.

It is very difficult to achieve a liquid supply that does not overflow the microgrooves or microgaps, when trying to provide liquid fluid within the microgrooves or microgaps located on the evaporative outer face of tubes arranged in a bundle of tubes, as they are usually arranged in latent heat exchangers. This difficulty of supplying the fluid so that it is introduced in an orderly manner within the capillary structures of the evaporating external face causes the appearance of thin descending layers due to the excess supply of liquid fluid on the evaporating capillaries or causes the appearance of dry areas when the supply is insufficient. Both phenomena limit the actual aggregate coefficient of latent heat exchange of the walls of these latent heat exchangers.

It is practically impossible to supply liquid to evaporate on the outer face of the horizontal tubes located in the center of a tube bundle, without having liquid overflows above the microgrooves, because the flow rate necessary to supply all the tubes in the bundle is greater than the flow rate which can be channeled inside the microgrooves of each tube. Thus, the liquid meant to be evaporated ends up forming thin films that cover the microgrooves on the outer face, preventing them from acting in a capillary evaporation regime and creating thermally insulating layers that reduce the added latent heat transfer coefficient of the exchanger tube.

SUMMARY

The present invention seeks to increase the aggregate latent heat transfer coefficient and reduce the temperature differential or gradient between the condensing face and the evaporating face of a latent heat exchanger by means of an arrangement of a latent heat exchange chamber, as defined in the claims.

The latent heat exchange chamber has the following characteristics:

It is a chamber with a level of tightness sufficient to maintain a differential or gradient between the pressure inside it and the pressure in the housing that contains said chamber.

It can be made for use in a horizontal or vertical latent heat exchanger.

Its outer face is a condenser where the gas phase that condenses releases the condensation heat. Its inner face is an evaporator where the evaporating liquid phase absorbs the latent heat of evaporation.

Its inner evaporating face is covered with microgrooves or microgaps within which the liquid to be evaporated flows, forming menisci with a concave liquid-vapour interface.

Its outer condensing face is covered with microgrooves, or another capillary structure, on which the vapour to be condensed condenses in a capillary condensation regime, forming menisci with a concave liquid-vapour interface.

The chamber wall can have a zigzag, crenellated or corrugated section so that the condensing meniscus and evaporating meniscus are juxtaposed on both sides of the chamber wall, or separated by a short thermal path between both menisci.

The layers of thermally insulating liquid are reduced or eliminated in the thermal path from the latent heat of condensation released on the condensing outer face and the latent heat absorbed on the evaporating inner face, because of the combination of the following elements:

The microgrooves or other capillary structure of the condensing face have the necessary shape, inclination and section to evacuate the condensed liquid, so that between the condensing meniscus and the end of the capillary structure that houses it, there is an area free of liquid layers.

The micro-grooves or micro undulations on the evaporating face have the necessary shape, inclination and section to channel the liquid to be evaporated and to evacuate the rest of the non-evaporated liquid with the desired salt concentration and to ensure that between the evaporating meniscus and the end of the microgroove or micro undulation that houses it, there is at least one liquid-free zone along the microgroove or micro undulation.

The ordered supply of the liquid to be evaporated within the microgrooves or micro undulations on the evaporating face. The arrangement of the evaporator face inside the chamber allows easy access inside each and every chamber and orderly and uniform supply of liquid within the microgrooves or micro undulations of the evaporator face of each chamber, minimizing liquid overflows above the microgrooves and minimizing dry areas, so that the current problem of exchanger tubes configured in a horizontal tube bundle is overcome, whose evaporating surface is on the outer face of a state-of-the-art tube, in which it is practically impossible to supply the liquid to the tubes located in the central part of the tube bundle of the exchanger, without forming liquid films, since the water supply in a tube-to-tube cascade implies a higher flow rate than the microgrooves of the outer evaporating face can contain. In the configuration of a state-of-the-art horizontal tube bundle, thin water films are necessarily formed on the outer evaporating face, which reduces the added latent heat transfer coefficient. On the other hand, if the evaporator face is located inside the tube, it is possible to access directly inside each tube and make a controlled, dosed, uniform and precise supply within the microgrooves, without the formation of overflowing water layers.

The combination of a good dosage of the liquid by means of the delivery system on the evaporating inner face combined with the evaporation inside the capillary structure that covers it allows the reduction or elimination of liquid layers on the evaporating face.

The absence of liquid layers with thermal resistance in the path between the latent condensation heat release point and the latent evaporation heat absorption point allows higher coefficients of latent heat transfer of the exchanger to be achieved, which permits to reduce the differentials or temperature gradients between the vapour on the condensing side and the vapour on the evaporating side.

BRIEF DESCRIPTION OF THE FIGURES

A more detailed explanation of the invention is given in the description that follows and which is based on the attached figures.

DESCRIPTION

Figure 1:
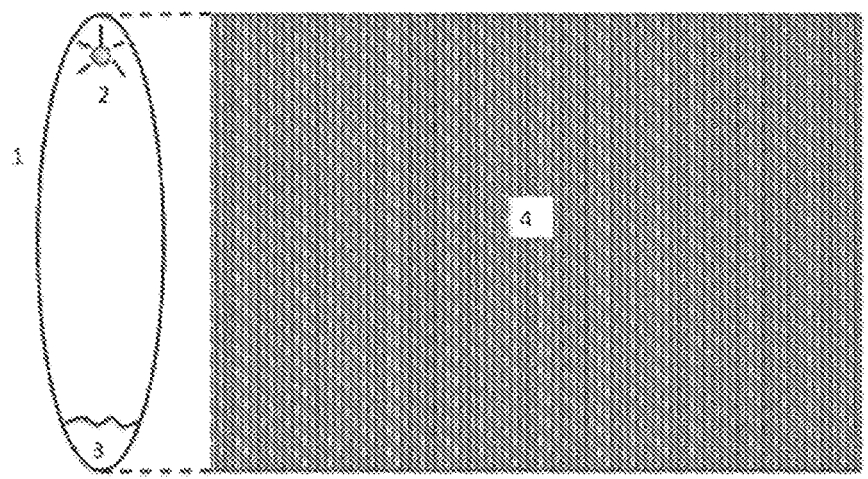
FIG. 1 shows a cross section of the latent heat exchange chamber and its internal supply system of liquid to evaporate, as well as a view of the condensing outer wall of the latent heat exchange chamber covered, at least in part, with microgrooves or other capillary structure.
Figure 2:
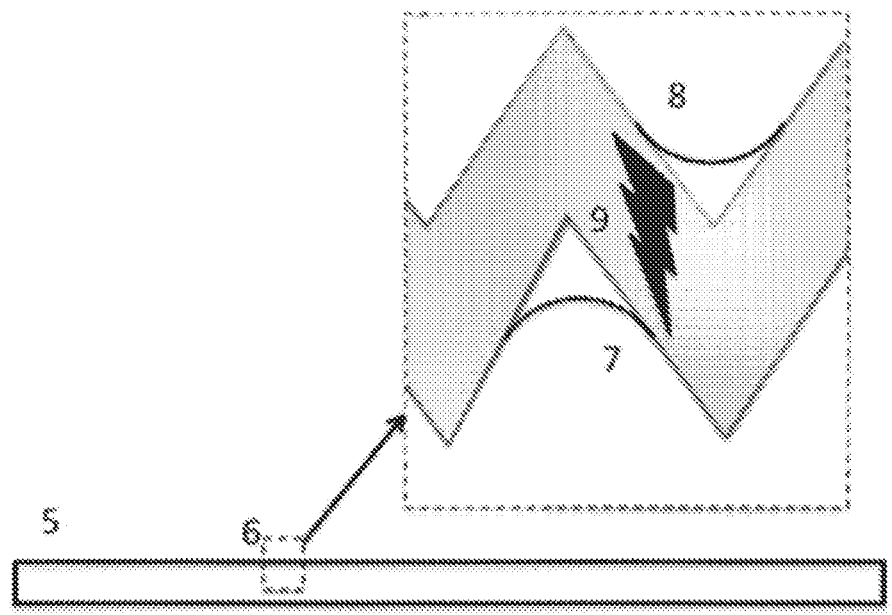
FIG. 2 shows a longitudinal section of a latent heat exchange chamber in one embodiment with the microgrooves perpendicular to the axis of the chamber and an enlarged detail of its zigzag section.

FIGS. 1 and 2 show an arrangement of a latent heat exchange chamber 1 condensing on its outer face and evaporating on its inner face.

The outer face of the heat exchange chamber is covered 4, at least in part, with microgrooves or other capillary structure in which the vapour condenses in a capillary condensation regime. The condensed liquid on the outer face forms menisci 8 with a concave liquid-vapour interface. Capillary condensation occurs on this meniscus and energy is released in the form of latent heat.

The inner face of the latent heat exchange chamber is covered, at least in part, with microgrooves or micro undulations in which the liquid to evaporate flows orderly, forming menisci 7 with a concave liquid-vapour interface. From the upper end of these menisci 7 the most efficient evaporation occurs and the latent heat is absorbed.

Figure 4:
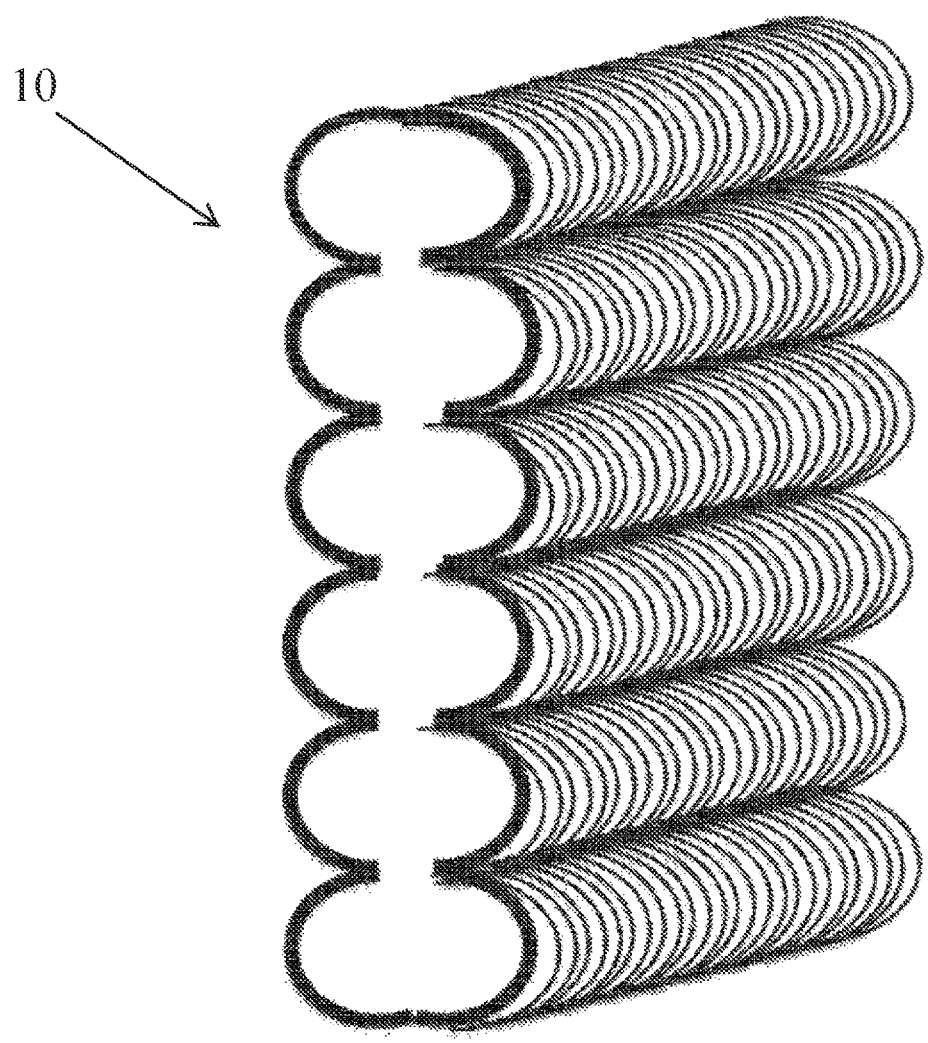
FIG. 4 shows a cross section of a chamber in an embodiment with a corrugated irregular section and with a view of its outer face with microgrooves or micro undulations.

The latent heat exchange chamber that condenses on its outer face and evaporates on its inner face can be realized in a horizontal configuration as shown in FIG. 1 or in a vertical configuration. One embodiment is with microgrooves or micro undulations parallel to the axis of the chamber for installation in a vertical configuration. Another embodiment is with the microgrooves or micro undulations perpendicular to the axis of the chamber for installation in a horizontal configuration. The latent heat exchange chamber has an oval section 1 as shown in FIG. 1, or it can also have a square, rectangular, circular or irregular section as shown in FIG. 4. The section is a parameter that will depend on the characteristics of the device in which the heat exchanger is incorporated and the distillation to be carried out.

For chambers operating in a horizontal configuration, at least one mechanism 2 for supplying the liquid to be evaporated is incorporated into the chamber, the excess 3 of which is evacuated from the lower area of the exchange chamber. This mechanism 2 for supplying the liquid to be evaporated can be of a shower, sprinkling, spray or misting type to create a spray or mist that wets the microgrooves or micro undulations, forming menisci and without creating overflows above the microgrooves. The evacuation of the excess liquid 3 and the vapour released in the evaporation process is done from at least one of the ends of the chamber or from specific openings created in the chamber for these purposes.

Figure 5:
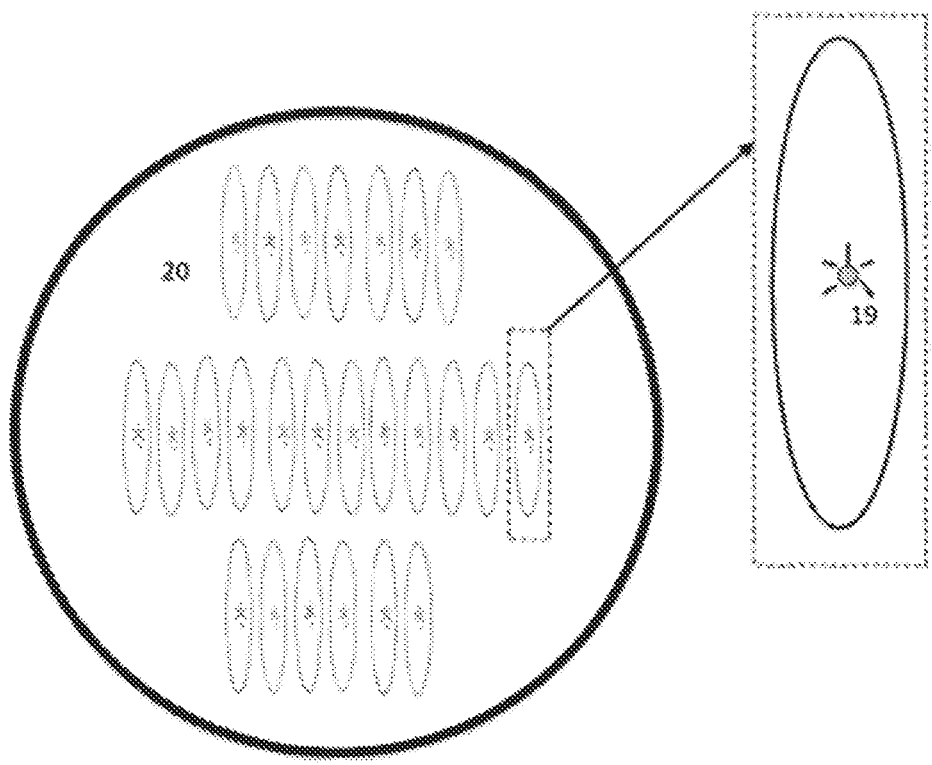
FIG. 5 shows a cross section of a device with vertically arranged chambers and a detail of the chamber with internal saline solution delivery system.

As shown in FIG. 5, for the chambers operating vertically, the liquid to be evaporated can be supplied on the evaporating inner face of the chamber by means of a system for supplying 19 the liquid under pressure, at least in the upper part of each chamber, and mechanisms or designs of gravitational supply can be used within the chamber as regards the liquid to be evaporated.

FIG. 2 shows a longitudinal section 5 of the wall of the latent heat exchange chamber, in an embodiment with the microgrooves perpendicular to the axis of the chamber, and an enlargement of its section 6 in zigzag to juxtapose or bring the evaporating meniscus 8 closer to the evaporating meniscus 7 and to achieve a thermal path 9 free of liquid layers. This closeness of the menisci and the thermal path free of water layers can also be achieved with a crenellated or corrugated section.

The inner face of the latent heat exchange chamber is covered with microgrooves or micro undulations in which the liquid to evaporate forms a meniscus 7 with a concave liquid-vapour interface. The most efficient evaporation of the liquid occurs from the upper end of this meniscus 7. The section of the microgroove or micro undulations and its inclination are sufficient so that between the end of this meniscus 7 and the end of the microgroove or micro undulations that houses it there exists an area free of liquid layers or films.

The outer face of the latent heat exchange chamber is covered with microgrooves or other capillary structures in which the vapour condenses in a capillary condensation regime and forms menisci 8 with a concave liquid-vapour interface. The section of the microgroove or other capillary structure and its inclination are sufficient so that there is an area free of liquid layers or films between the end of the condensed liquid meniscus 8 and the end of the capillary structure that houses it.

The latent heat exchange chamber 1, 5, 20 with capillary evaporation inside and capillary condensation on the outside minimizes the formation of thermally insulating liquid films by combining the following factors:

1—Between the end of the condensing meniscus 8 and the end of the capillary structure on the outer face of the chamber wall, there is an area free of layers of condensed liquid through which the energy released is efficiently transferred as latent heat of condensation. On the evaporating inner face there is also a zone free of liquid layers between the meniscus end 7 and the end of the capillary structure that houses it. So there is an efficient thermal path 9, free of liquid layers, between the upper part of the condensing meniscus 8 where the latent heat of condensation is released on the outer face and the upper end of the meniscus 7 of the liquid to be evaporated on the inner face, where the latent heat is absorbed.

2—The supply of the liquid on the inner evaporating face is not done in a descending film regime. The liquid to be evaporated is supplied inside the microgrooves or micro undulations through which it flows forming menisci. In a horizontal configuration of the latent heat exchange chamber, at least one duct 2 is incorporated inside the chamber with devices for distributing the liquid to be evaporated located along the tube. Some forms of this distribution of the liquid can be by shower; sprinkling, spraying or misting creating microdroplets or mist inside the chamber that wet all the microgrooves or micro undulations.

In a vertical configuration of the heat exchange chamber, the liquid to be evaporated is supplied by at least one duct 19 with at least one liquid distribution mechanism in the upper part of the chamber. Some forms of distribution of the liquid to be evaporated can be by showering, sprinkling, spraying or misting. It is also possible to use at least one overflow or gravitational supply system for the liquid to be evaporated, placed in the upper part of the chamber to supply the liquid to be evaporated in an orderly manner within microgrooves or micro undulations on the inner face of the chamber.

3—The arrangement of the evaporating face inside the chamber allows to supply the amount of liquid to evaporate in a uniform and dosed way, within the microgrooves or microgaps on the evaporating face of each chamber, without forming liquid overflows above of the microgrooves that would give rise to thermally insulating liquid layers. In this way the current problem of tube bundles in a horizontal position with the outer evaporating face is overcome, in which it is impossible to provide liquid on the outer face of the tubes located in the center of the bundle without creating liquid films having a thickness greater than the evaporating microgrooves because the flow rate necessary to supply all the tubes requires thicknesses greater than the volume of liquid that can flow inside the microgrooves. In vertical configurations, the placement of a dosing device, dispenser or spray inside each chamber allows a uniform and precise supply within all the microgrooves or micro undulations of the evaporating face inside the chamber. In vertical configurations, it is also possible to have at least one uniform and precise metered gravitational overflow system to provide the liquid to be evaporated inside the microgrooves or micro undulations of each chamber.

Thus, between the point where the latent heat of condensation is released on the meniscus 8 on the outer condensing face and the point of absorption of the latent heat of evaporation at the end of the meniscus 7 on the inner evaporating face, the energy is transferred through a thermal path 9 free of liquid layers, reducing or eliminating the thermal resistances imposed by liquid layers.

This path 9 free of liquid layers or films also theoretically occurs in the evaporator-condenser tubes with capillary structures on their inner condensing face and on their outer evaporating face. But in practice, when these tubes are placed in such a way as to form a bundle of tubes, in a latent heat exchanger, it is difficult to access the outer face of the tubes inside the bundle, especially in horizontal configurations, and the supply of the liquid on the evaporating outer face of these tubes ends up overflowing the microgrooves and forming descending films that cover the microgrooves and forming dry areas. Both phenomena reduce the aggregate coefficient of latent heat transfer. To avoid these fluid supply problems within the microgrooves on the evaporating face, it is essential to reverse the position of the evaporating face and place it inside the latent heat exchange chamber where a precise quantity of the liquid to be evaporated can be supplied inside the microgrooves or micro undulations.

The arrangement of the evaporating zone on the inner face of the chamber also facilitates periodic chemical cleaning processes, ensuring that the entire evaporating surface is immersed in cleaning liquid during the programmed period of time. The supply system 2 also allows periodic pressure cleaning applications inside the chamber.

Figure 3:
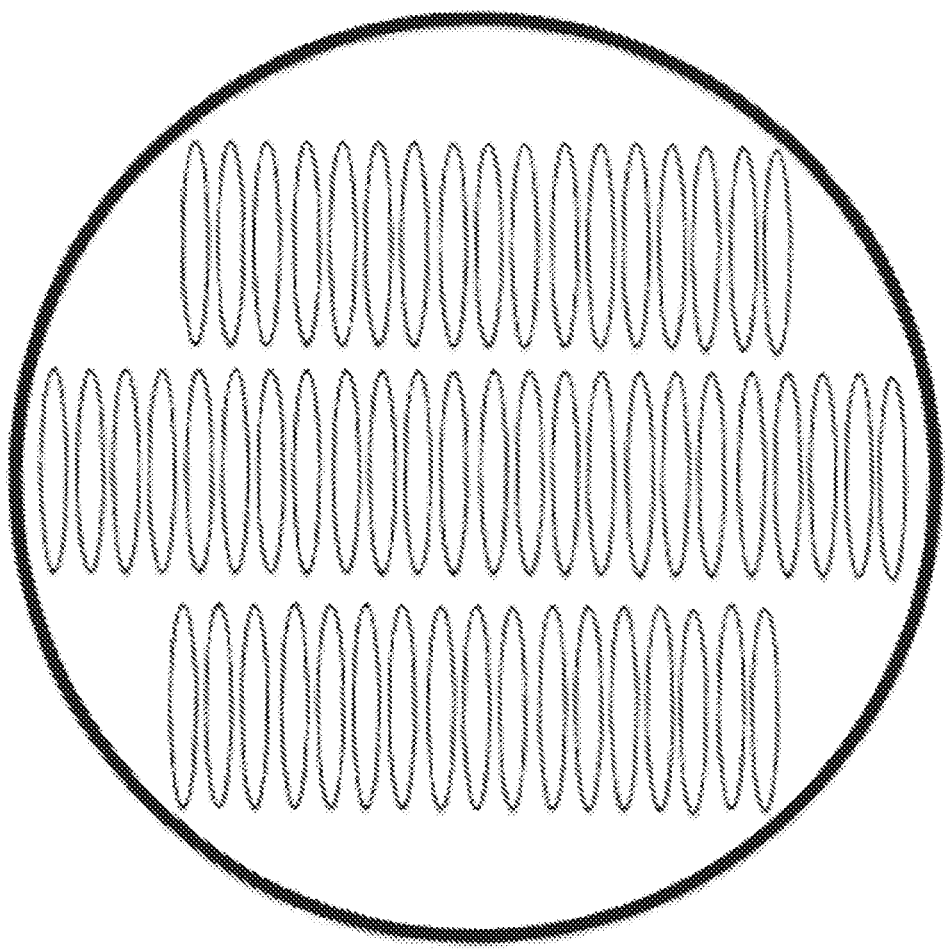
FIG. 3 shows a cross section of a horizontal housing and chamber device, in one embodiment with the chambers placed in overlapping rows.

Latent heat exchange chambers can have a height equal to the diameter of the housing that houses them or they can have a lower height. FIG. 3 shows a cross section of an embodiment with a housing device with horizontal chambers grouped in rows on various levels. The height of the chamber can be adapted to the conditions of the distillation to be performed. Among other factors, its height can be a function of the combination of the flow rate that can pass through the microgroove or micro undulations, the evaporation ratio and the desired concentration of the unevaporated brine.

FIG. 4 shows a cross section and a view of the outer face of an embodiment with a chamber covered with microgrooves with an irregular corrugated section 10. This section 10 allows the chamber to occupy a volume similar to that occupied by a bundle of tubes in a current configuration of a state-of-the-art shell and tubes latent heat exchanger.

The arrangement of latent heat exchange chambers with capillary condensation on their outer face and evaporation from the end of the meniscus in the capillaries on their inner face and the efficient fluid distribution within the microgrooves or micro undulations achieved with a precise supply of the liquid to be evaporated inside the chamber permit:

1—To achieve in practice latent heat transfer coefficients higher than the ones obtained in current latent heat exchangers;

2—To work with temperature differentials between the temperature of the condensed vapour on the outer face and the temperature of the evaporated vapour on the inner face reaching gradients of only 0.2° C., and less, plus the temperature jump required by the elevation of the boiling point of the saline solution to evaporate;

3—To achieve these transfer coefficients and temperature gradients by working at low temperatures. Specifically, in the case of desalination devices, working at temperatures that may be similar or close to the ambient temperature of the liquid to be desalinated.

The invention claimed is:

1. A latent gas to liquid heat exchange apparatus comprising:
  a chamber having a wall with an outer face and an inner face condensing on the outer face and evaporating on the inner face;
  wherein the outer face of said chamber is covered, at least in part, with microgrooves or other capillary structure in which condensation is carried out in a capillary regime and menisci of condensed liquid are formed with a concave liquid-vapour interface;
  the inner face of the chamber is covered, at least in part, with microgrooves or micro undulations in which liquid to be evaporated flows and forms menisci with a concave liquid-vapour interface and the evaporation occurs from the upper end of the meniscus where the evaporation is most efficient; the liquid to be evaporated is supplied in a direct and controlled manner, on the evaporating inner face of the chamber without undesired liquid overflows in the microgrooves or micro undulations and reducing or eliminating dry areas; and
  thermal paths free of liquid layers are provided between the surface of the condensing meniscus where the gas phase condenses and releases the latent heat of condensation and the end of the evaporating meniscus where the liquid phase evaporates and absorbs the latent heat of evaporation.

2. The apparatus according to claim 1, wherein one section of the chamber wall in the direction of the microgrooves or micro unudulations has a zigzag, crenellated or corrugated shape.

3. The apparatus according to claim 1 wherein the latent heat exchange chamber has an oval cross section.

4. The apparatus according to claim 1 wherein the latent heat exchange chamber has a circular cross section.

5. The apparatus according to claim 1, wherein the latent heat exchange chamber has a rectangular or square cross section.

6. The apparatus according to claim 1, wherein microgrooves or micro undulations are perpendicular to the central axis of the chamber, for the use of latent heat exchanger in horizontal configurations.

7. The apparatus according to claim 1, wherein the microgrooves or micro undulations are parallel to the central axis of the chamber, for the use of latent heat exchanger in vertical configurations.

8. The apparatus according to claim 1, wherein the latent heat exchange chamber comprises inside at least one duct for supplying the liquid to be evaporated, with at least one dispenser to showering, sprinkling, spraying or misting the liquid.

9. The apparatus according to claim 1, wherein the latent heat exchange chamber has a vertical configuration and has at the upper end of the chamber at least one evaporater for gravitational dosing of the liquid to be evaporated on the inner face of the chamber.

* * * * *